US012466702B2

(12) United States Patent
Kanda

(10) Patent No.: US 12,466,702 B2
(45) Date of Patent: Nov. 11, 2025

(54) CRANE AND TRANSPORTATION DESTINATION PRESENTATION METHOD

(71) Applicant: TADANO LTD., Kagawa (JP)

(72) Inventor: Shinsuke Kanda, Kagawa (JP)

(73) Assignee: TADANO LTD., Kagawa (JP)

( * ) Notice: Subject to any disclaimer, the term of this patent is extended or adjusted under 35 U.S.C. 154(b) by 636 days.

(21) Appl. No.: 17/802,386

(22) PCT Filed: Mar. 8, 2021

(86) PCT No.: PCT/JP2021/008982
§ 371 (c)(1),
(2) Date: Aug. 25, 2022

(87) PCT Pub. No.: WO2021/182392
PCT Pub. Date: Sep. 16, 2021

(65) Prior Publication Data

US 2023/0192455 A1 Jun. 22, 2023

(30) Foreign Application Priority Data

Mar. 9, 2020 (JP) ................................ 2020-040136

(51) Int. Cl.
*B66C 13/46* (2006.01)
*B66C 1/40* (2006.01)
*B66C 23/90* (2006.01)

(52) U.S. Cl.
CPC ................ *B66C 13/46* (2013.01); *B66C 1/40* (2013.01); *B66C 23/905* (2013.01); *B66C 2700/082* (2013.01)

(58) Field of Classification Search
CPC ......... B66C 13/46; B66C 1/40; B66C 23/905; B66C 2700/082; B66C 13/48; B66C 13/40; B66C 13/16; G06F 30/20; G06T 17/00
See application file for complete search history.

(56) References Cited

U.S. PATENT DOCUMENTS 5,645,181 A * 7/1997 Ichiba ..................... B66C 13/46 212/281
2013/0103271 A1* 4/2013 Best ........................ B66C 13/40 701/50

(Continued)

FOREIGN PATENT DOCUMENTS

| | | | |
|---|---|---|---|
| EP | 2674383 | A2 | 12/2013 |
| JP | 2011-060496 | A | 3/2011 |
| WO | WO 2018/220614 | A1 | 12/2018 |

OTHER PUBLICATIONS

Feb. 26, 2024, European Search Report issued for related EP Application No. 21767013.2.

(Continued)

*Primary Examiner* — Timothy R Waggoner
(74) *Attorney, Agent, or Firm* — Paratus Law Group, PLLC

(57) ABSTRACT

A crane for transporting a load from a transportation origin to a transportation destination, the crane being provided with: an operation function unit provided so as to be turnable; a hook suspended by a wire rope from a distal end part of the operation function unit; an information-reading unit provided to the hook or a member that moves with the hook, the information-reading unit acquiring information relating to a position of the transportation destination from an information storage unit provided to the load; a control unit for calculating, on the basis of the information relating to the position acquired from the information-reading unit, information relating to an operation of the crane for transporting the load to the transportation destination; and a display unit for displaying the information relating to the position and the information relating to the operation.

9 Claims, 5 Drawing Sheets

(56) References Cited

U.S. PATENT DOCUMENTS

| | | | | |
|---|---|---|---|---|
| 2013/0335271 | A1* | 12/2013 | Lim | G01S 3/04<br>342/386 |
| 2018/0346294 | A1* | 12/2018 | Shely | B66C 23/905 |
| 2020/0165107 | A1* | 5/2020 | Kosaka | G01B 11/00 |
| 2021/0039923 | A1* | 2/2021 | Minami | B66C 13/08 |
| 2021/0221654 | A1* | 7/2021 | Yodawara | G07C 5/008 |

OTHER PUBLICATIONS

May 11, 2021, International Search Report issued for related PCT Application No. PCT/JP2021/008982.
May 11, 2021, International Search Opinion issued for related PCT Application No. PCT/JP2021/008982.

* cited by examiner

CRANE AND TRANSPORTATION DESTINATION PRESENTATION METHOD

CROSS REFERENCE TO PRIOR APPLICATION

This application is a National Stage Patent Application of PCT International Patent Application No. PCT/JP2021/008982 (filed on Mar. 8, 2021) under 35 U.S.C. § 371, which claims priority to Japanese Patent Application No. 2020-040136 (filed on Mar. 9, 2020), which are all hereby incorporated by reference in their entirety.

TECHNICAL FIELD

The present invention relates to a crane and a transportation destination presentation method.

BACKGROUND ART

Patent Literature 1 discloses a crane having a boom provided in a turnable manner and a hook suspended from a distal end part of the boom via a wire rope.

When a load is transported by the crane, an operator of the crane (hereinafter, referred to as “crane operator”) operates the boom to move the hook to a position of the temporarily placed load.

An operator who performs slinging work (hereinafter, referred to as a “slinging operator”) is on standby in the periphery of the temporarily placed load. The slinging operator performs the slinging work of attaching a slinging tool (for example, a wire rope for slinging) to the load.

CITATION LIST

Patent Literature

Patent Literature 1: JP 2011-60496 A

SUMMARY OF THE INVENTION

Problems to be Solved by the Invention

In the case of the crane disclosed in Patent Literature 1 as described above, the slinging operator acquires target arrangement information of the load from an IC tag attached to the load by a member information reading device. Such work is troublesome and causes deterioration in work efficiency.

An object of the present invention is to provide a crane and a transportation destination presentation method capable of improving work efficiency of transportation work.

Solutions to Problems

An aspect of a crane according to the present invention is a crane for transporting a load from a transportation origin to a transportation destination, the crane being provided with: an operation function unit provided so as to be turnable; a hook suspended by a wire rope from a distal end part of the operation function unit; an information-reading unit provided to the hook or a member that moves with the hook, the information-reading unit acquiring information relating to a position of the transportation destination from an information storage unit provided to the load; a control unit calculating, on the basis of the information relating to the position acquired from the information-reading unit, information relating to an operation of the crane for transporting the load to the transportation destination; and a display unit displaying the information relating to the position and the information relating to the operation.

An aspect of a transportation destination presentation method according to the present invention is a transportation destination presentation method performed in a crane for transporting a load from a transportation origin to a transportation destination, the transportation destination presentation method being provided with: a step of acquiring, by an information-reading unit provided in a hook or a member that moves with the hook, information relating to a position of the transportation destination from an information storage unit provided to the load; a step of calculating, on the basis of the information relating to the position acquired from the information-reading unit, information relating to an operation of the crane for transporting the load to the transportation destination; and a step of displaying the information relating to the position and the information relating to the operation.

Effects of the Invention

According to the present invention, the work efficiency of the transportation work can be improved.

DESCRIPTION OF EMBODIMENTS

Hereinafter, some embodiments according to the present invention will be described in detail with reference to the drawings. Note that a crane according to an embodiment to be described later is an example of a crane according to the present invention, and the present invention is not limited by the embodiment to be described later.

Embodiment

Figure 1:
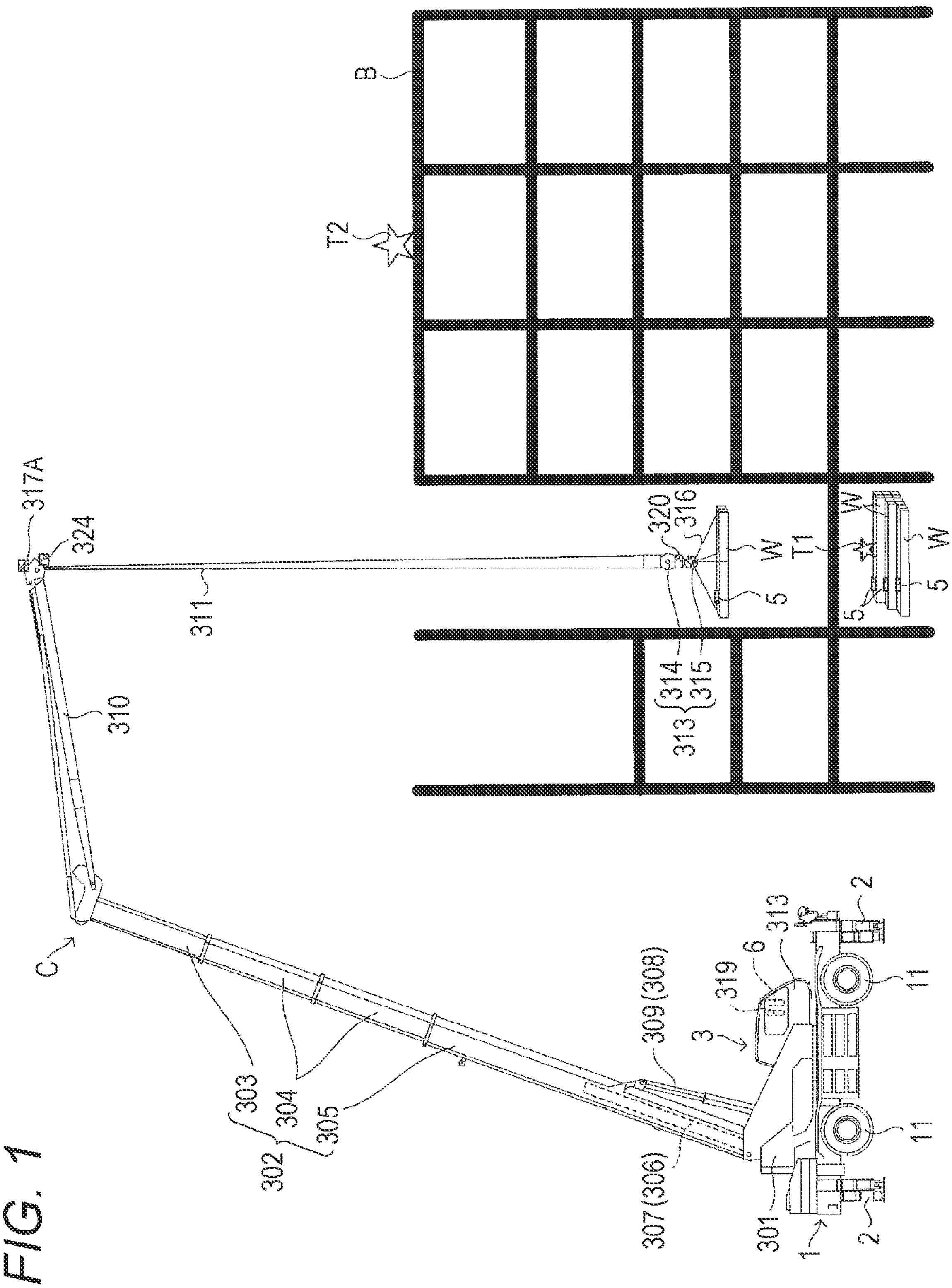
FIG. 1 is a view schematically illustrating a work site where a crane according to an embodiment of the present invention is disposed.
Figure 2:
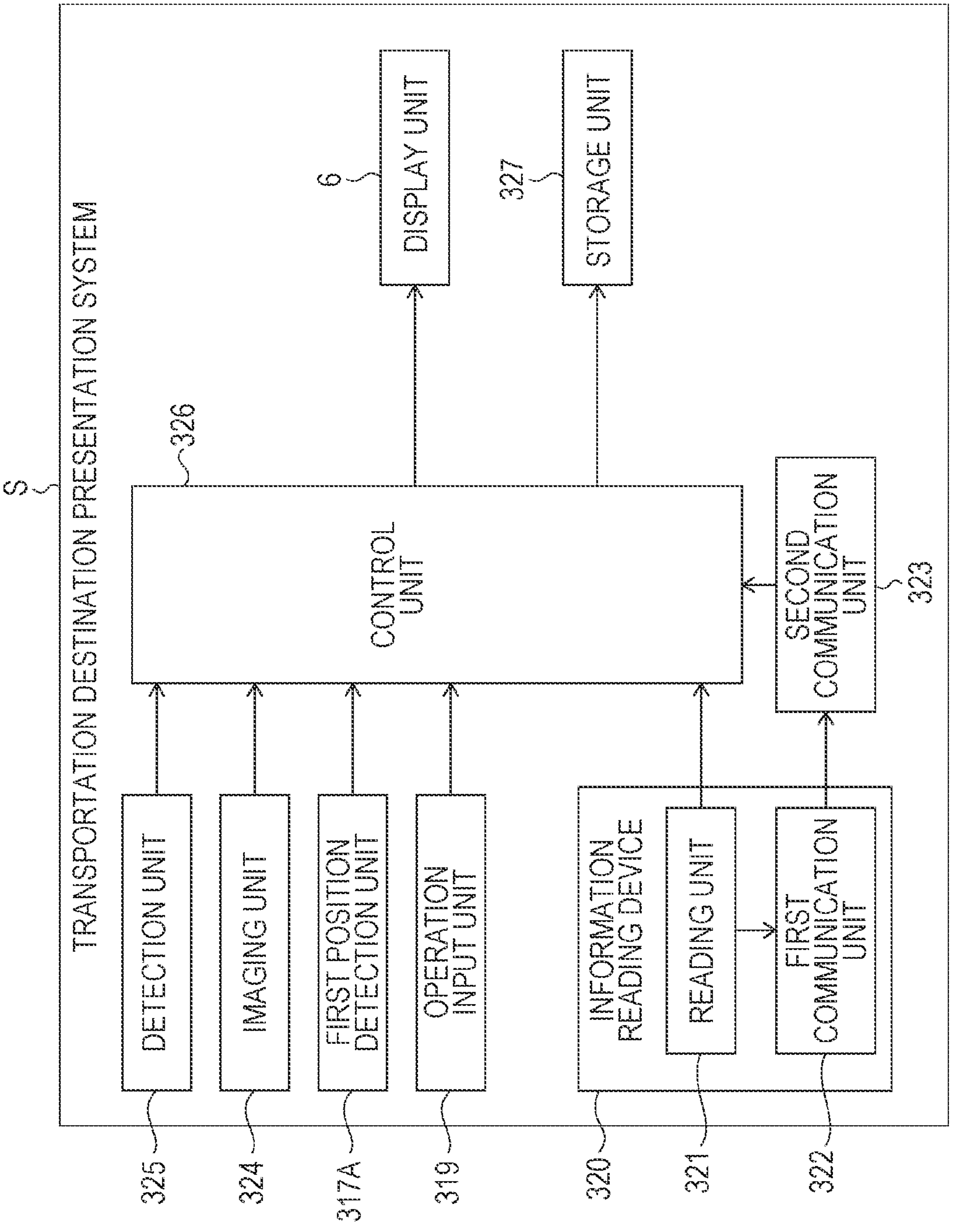
FIG. 2 is a block diagram illustrating a configuration of a transportation destination presentation system.

FIG. 1 is a side view of a mobile crane (a rough terrain crane in the illustrated case) according to an embodiment in a working state.

Examples of the mobile crane include an all-terrain crane, a truck crane, and a loading-type truck crane (also referred to as a cargo crane). However, the crane according to the present invention is not limited to the mobile crane, and may be, for example, a tower crane.

<Mobile Crane>

As illustrated in FIG. 1, a mobile crane C includes a traveling body 1, outriggers 2, and a turning body 3. FIG. 1 is a schematic diagram illustrating a work site where the mobile crane C is disposed.

As an example of transportation work performed by the mobile crane C, the mobile crane C transports a load W from a transportation origin T1 (a position indicated by a small star in FIG. 1) at which the load W is temporarily placed to a transportation destination T2 (a position indicated by a large star in FIG. 1).

<Outline of Configuration of Crane>

The mobile crane C according to the present embodiment acquires information (for example, coordinates) relating to the position of the transportation destination T2 from an information storage unit 5 provided to the load W by an information-reading unit (an information reading device 320) provided in a hook device 312. In addition, the mobile crane C calculates information relating to the operation of the crane for transporting the load W to the transportation destination T2. Then, the acquired information relating to the position and the calculated information relating to the operation of the crane are displayed on a display unit 6. Hereinafter, a specific configuration of the mobile crane C will be described.

<Traveling Body>

The traveling body 1 has a plurality of wheels 11. The outriggers 2 are provided at four corners of the traveling body 1. The turning body 3 is turnably provided on an upper part of the traveling body 1.

<Turning Body>

The turning body 3 includes a turning base 301, a telescopic boom 302, an extension/retraction device 306, a luffing device 308, a jib 310, a wire rope 311, and the hook device 312.

In addition, the turning body 3 includes a cab 313, a position detection unit 317A, the display unit 6, an operation input unit 319, the information reading device 320, a second communication unit 323, an imaging unit 324, a detection unit 325, a control unit 326, and a storage unit 327.

<Turning Base>

The turning base 301 is turnably supported by the traveling body 1 and is configured to turn the turning body 3.

<Telescopic Boom>

The telescopic boom 302 corresponds to an example of a boom and has a proximal end part fixed to the turning base 301. The telescopic boom 302 includes a plurality of boom elements. Each of the plurality of boom elements has a tubular shape. The plurality of boom elements are combined with each other in a telescopic manner.

Specifically, in a retracted state, the plurality of boom elements are a distal boom element 303, an intermediate boom element 304, and a proximal boom element 305 in order from the inner side. As the intermediate boom element 304, the present embodiment includes two intermediate boom elements. Note that the number of the intermediate boom elements 304 may be either one or three or more. In addition, the boom is not limited to the telescopic boom, and may be a non-telescopic boom.

<Extension/Retraction Device>

The extension/retraction device 306 includes a hydraulic source (not illustrated), a hydraulic pump (not illustrated), a control valve (not illustrated), an extension/retraction cylinder device 307, and the like. The respective elements constituting the extension/retraction device 306 are connected to each other by pipes. The extension/retraction device 306 extends and retracts the telescopic boom 302 on the basis of extension and retraction of the extension/retraction cylinder device 307.

<Luffing Device>

The luffing device 308 includes a hydraulic source (not illustrated), a hydraulic pump (not illustrated), a control valve (not illustrated), an extension/retraction cylinder device 309, and the like. The luffing device 308 raises and lowers the telescopic boom 302 on the basis of extension and retraction of the extension/retraction cylinder device 309.

<Jib>

The jib 310 is connected to a distal end part of the telescopic boom 302. The wire rope 311 hangs down from a distal end part of the jib 310.

<Hook Device>

The hook device 312 corresponds to an example of a hook, and is suspended by the wire rope 311 from the distal end part of the jib 310.

Specifically, the hook device 312 includes a hook block 314 and a hook 315. The hook block 314 has a sheave (not illustrated). The wire rope 311 is wound around the sheave. In the present embodiment, the number of hooks of the wire rope 311 is two. However, the number of hooks of the wire rope 311 is not limited to the case of the present embodiment. The number of hooks of the wire rope may be either one or three or more.

Note that the telescopic boom 302 and the jib 310 correspond to examples of an operation function unit in the present embodiment. There is also a case where the jib 310 is not used depending on a work state. In the case where the jib 310 is not used, the telescopic boom 302 corresponds to an example of the operation function unit.

<Position Detection Unit>

The position detection unit 317A acquires information relating to its own position.

In the present embodiment, the position detection unit 317A is a GNSS antenna for receiving information from a satellite positioning system such as a global positioning system (GPS). The position detection unit 317A acquires information (coordinates) relating to its own position from the satellite positioning system.

In the case of the present embodiment, the position detection unit 317A is provided at a distal end part of the operation function unit (the jib 310 in the case of the present embodiment). Thus, in the case of the present embodiment, the information relating to the position acquired by the position detection unit 317A (hereinafter, referred to as "position information") is also information relating to the position of a distal end part of the operation function unit (the jib 310 in the case of the present embodiment).

Note that the position of the position detection unit 317A is not limited to the position in the present embodiment. The position of the position detection unit 317A is preferably a position close to the distal end part of the operation function unit (the jib 310 in the case of the present embodiment). In the case where the jib 310 is not used, the position detection unit 317A may be provided at the distal end part of the telescopic boom 302.

The position detection unit 317A transmits information relating to the detected position to the control unit 326.

<Display Unit>

The display unit 6 displays information and the like. The display unit 6 is provided in the cab 313. The display unit 6 is, for example, a display or a monitor. The display may be a touch panel display.

<Operation Input Unit>

The operation input unit 319 corresponds to an example of an operation unit and is provided in the cab 313. The operation input unit 319 includes, for example, an operation tool for operating traveling of the mobile crane C and an operation tool for operating the mobile crane C.

The operation tool for operating the mobile crane C may include, for example, at least one operation tool among a turning operation tool (not illustrated) for operating a turning motion of the boom, a luffing operation tool (not illustrated) for operating a luffing motion of the boom, a telescopic operation tool (not illustrated) for operating a telescopic motion of the boom, and a drum operation tool (not illustrated) for operating a winch.

The operation tool for operating the mobile crane C includes, for example, a plurality of levers corresponding to motions of the mobile crane C. An operation direction of the lever corresponds to a direction of the motion of the mobile crane C, and an operation amount of the lever corresponds to a speed of the motion of the mobile crane C.

Note that the winch is a device for reeling in (winding up) and reeling out (winding down) the wire rope. In the Description, the winch may be any one of a main winch for reeling in and out the wire rope suspending a main hook and a sub winch for reeling in and out the wire rope suspending a sub hook, or may include both the winches.

<Information Reading Device>

The information reading device 320 corresponds to an example of an information-reading unit, and is provided in the hook device 312. The information reading device 320 includes a reading unit 321 and a first communication unit 322.

The reading unit 321 has a function of acquiring information from the information storage unit 5 (described later) provided to the load W transported by the mobile crane C. The reading unit 321 is, for example, an RFID reader that reads information from an IC tag such as an RF tag. Note that the information reading device 320 may include a writing unit for writing information in the IC tag.

The reading unit 321 establishes wireless communication with the information storage unit 5 and reads information stored in the information storage unit 5. Note that the load W is suspended by the hook 315 via the sling wire rope 316. The reading unit 321 sends the acquired information to the first communication unit 322.

The information read by the reading unit 321 is information relating to a load. Examples of the information relating to the load may include at least one information among identification information of the load, information relating to a position of a transportation origin of the load (hereinafter, referred to as "transportation origin position information of the load"), information relating to a position of a transportation destination of the load (hereinafter, referred to as "transportation destination position information of the load"), and specification information of the load.

The transportation destination position information of the load is, for example, coordinates (hereinafter, simply referred to as "transportation destination coordinates") of the transportation destination of the load. The transportation destination coordinates may be local coordinates based on a predetermined position in a work site or global coordinates.

The specification information of the load may include at least one information among information relating to a dimension of the load (hereinafter, referred to as "dimensional information of the load"), information relating to a weight of the load (hereinafter, referred to as "weight information of the load"), and information relating to a shape of the load (hereinafter, referred to as "shape information of the load").

The first communication unit 322 establishes wireless communication with a second communication unit 323 (described later), and transmits the information acquired from the reading unit 321 to the second communication unit 323.

A system for the wireless communication between the first communication unit 322 and the second communication unit 323 may be, for example, wireless LAN such as WiFi (registered trademark), Bluetooth (registered trademark), near field communication (NFC), or the like.

The second communication unit 323 is provided, for example, in the cab 313. The second communication unit 323 establishes the wireless communication with the first communication unit 322 and acquires information from the first communication unit 322. The second communication unit 323 transmits the acquired information to the control unit 326.

<Imaging Unit>

The imaging unit 324 is, for example, a digital camera device. The imaging unit 324 is provided at the distal end part of the jib 310.

The imaging unit 324 is connected to the control unit 326. A connection system between the imaging unit 324 and the control unit 326 may be a wired connection system or a wireless connection system. The connection system between the imaging unit 324 and the control unit 326 may be a known connection system.

The imaging unit 324 captures an image of the lower side in the vertical direction from the distal end part of the jib 310 under the control of the control unit 326. The imaging unit 324 captures an image of the periphery of the hook device including the hook device 312 from the distal end part of the jib 310.

An angle of view of the imaging unit 324 may be any angle of view as long as an image of a predetermined range including the hook device 312 can be captured from the distal end part of the jib 310. The imaging unit 324 preferably has an angle of view capable of capturing an image of the position of the transportation origin of the load W (for example, a temporary storage location of the load W) and the position of the transportation destination of the load W. The imaging unit 324 may be capable of changing an imaging direction under the control of the control unit 326.

The imaging unit 324 may capture an image including a route through which the load W passes when the mobile crane C moves the load W from the transportation origin to the transportation destination (hereinafter, referred to as a "route image") under the control of the control unit 326. The route image may be an image obtained by combining a plurality of still images.

The imaging unit 324 generates image data and sends the generated image data to the control unit 326. The imaging unit 324 may constantly capture images from the start to the stop under the control of the control unit 326. In addition, the imaging unit 324 may capture an image in a case where a predetermined condition is satisfied under the control of the control unit 326.

The imaging direction of the imaging unit 324 may be fixed to the lower side in the vertical direction. However, the imaging direction of the imaging unit 324 may be changeable. The imaging direction of the imaging unit 324 may be controlled by the control unit 326 on the basis of an operation input from an operator. Alternatively, the imaging direction of the imaging unit 324 may be automatically controlled by the control unit 326 on the basis of the determination of the control unit 326.

<Detection Unit>

The detection unit 325 detects information relating to the mobile crane C. The information relating to the mobile crane C includes information relating to an attitude of the mobile crane C. The detection unit 325 includes a plurality of sensors provided in the mobile crane C. The detection unit 325 transmits information relating to the detected attitude to the control unit 326.

Examples of the information relating to the attitude may include a luffing angle of the boom, a length of the boom, a turning angle of the boom, a luffing angle of the jib, a length of the jib, an overhanging width of the outrigger, and a suspended length of the wire.

Note that the information relating to the attitude may be not only the information detected by the sensor but also information calculated on the basis of the information detected by the sensor. The information relating to the attitude may include information necessary for calculation of position information of the hook device 312 performed by the control unit 326. Thus, the position information of the hook device 312 may be included in the information relating to the attitude.

The information detected by the detection unit 325 may include information necessary for detection of lift-off performed by the control unit 326. The information necessary for detection of the lift-off may be, for example, weight acting on the wire rope 311.

<Control Unit>

The control unit 326 controls a motion of each element of the mobile crane C described above. The control unit 326 may be a circuit or a device having calculation capability.

For the control unit 326, for example, at least one of a central processing unit (CPU), a micro processing unit (MPU), and a graphics processing unit (GPU) may be used. For example, the control unit 326 may be a control unit dedicated to a transportation destination presentation system.

In addition, the control unit 326 may be a control device such as a safety device (for example, an overload prevention device) provided in the mobile crane C. Functions of the control unit 326 to be described hereinafter may be achieved by one control unit or may be achieved by cooperation of a plurality of control units.

The control unit 326 acquires information relating to a position of the crane (hereinafter, referred to as "position information of the crane"). The control unit 326 acquires the position information (coordinates) of the crane on the basis of position information acquired from the position detection unit 317A.

Note that the position information of the crane may be information relating to a position of the position detection unit 317A or may be information relating to a position of another portion (for example, a turning center of the turning body 3) of the crane.

In a case where the position information of the crane is information relating to the position of the turning center of the turning body 3, the control unit 326 acquires information relating to a position of a turning center of the turning body 3 on the basis of the position information acquired from the position detection unit 317A, the information relating to the attitude of the crane acquired from the detection unit 325, and specification data (for example, information relating to a positional relationship between a luffing start point of the boom and the turning center of the turning body) of the crane acquired from the storage unit (not illustrated).

In addition, the position information of the crane may be local coordinates based on a predetermined position in a work site or global coordinates. In a case where the position information of the crane is the local coordinates, the control unit 326 appropriately converts the position information acquired from the position detection unit 317A into the local coordinates.

The control unit 326 acquires information relating to an orientation of the crane (hereinafter, "orientation information of the crane"). The control unit 326 acquires the orientation information of the crane on the basis of the position information acquired from the position detection unit 317A and the information relating to the attitude acquired from the detection unit 325. The orientation information of the crane may be regarded as an orientation of the front side of the crane.

The control unit 326 acquires the transportation destination position information of the load. The control unit 326 acquires the information relating to the position of the transportation destination of the load from the information reading device 320.

The control unit 326 acquires information relating to an attitude of the crane corresponding to a transportation destination (hereinafter, referred to as "attitude information of the crane at the transportation destination"). The control unit 326 calculates the attitude information of the crane at the transportation destination on the basis of the position information of the crane, the orientation information of the crane, and the transportation destination position information of the load.

The attitude information of the crane at the transportation destination means the attitude of the crane in a state where the crane has transported the load to the transportation destination. In this manner, the control unit 326 has a function of converting the position information of the crane, the orientation information of the crane, and the transportation destination position information of the load into the attitude information of the crane corresponding to the transportation destination.

The control unit 326 detects that the lift-off is completed. In addition, the control unit 326 determines whether the lift-off is completed.

The control unit 326 determines whether the lift-off is completed on the basis of the information (for example, weight acting on the wire rope 311) acquired from the detection unit 325. Specifically, when the weight acting on the wire rope 311 increases and then becomes constant, the control unit 326 determines that the lift-off is completed.

The control unit 326 performs a determination on whether the transportation work is possible (hereinafter, referred to as "transportation work determination"). The control unit 326 performs the transportation work determination by the following method.

The control unit 326 acquires performance information corresponding to the attitude information of the crane at the transportation destination. The performance information means the maximum weight of the load that can be lifted when the mobile crane C is in an attitude indicated by the attitude information of the crane at the transportation destination (hereinafter, referred to as an "attitude of the crane at the transportation destination"). Such performance information may be calculated by calculation or may be stored in advance in the storage unit.

In addition, the control unit 326 acquires weight information of the load from the information reading device 320. Then, the control unit 326 determines whether the mobile crane C can transport the load to the transportation destination on the basis of the acquired performance information and the acquired weight information of the load.

Specifically, when the acquired performance information is larger than the weight of the load to be transported, the control unit 326 determines that the mobile crane C can transport the load to the transportation destination. On the other hand, when the acquired performance information is smaller than the weight of the load to be transported, the control unit 326 determines that it is difficult for the mobile crane C to transport the load to the transportation destination.

The control unit 326 calculates information relating to an operation of the crane for transporting the load W to the transportation destination (hereinafter, referred to as "operation information of the crane"). The control unit 326 calculates the operation information of the crane for transporting the load W to the transportation destination on the basis of the information relating to the load acquired from the information reading device 320.

Examples of the operation information of the crane include information relating to an attitude that can be taken by the crane at the time of transporting the load W to the transportation destination (hereinafter, referred to as "attitude information of the crane").

The attitude information of the crane includes attitude information of the crane at the time of lifting up the load W at the transportation origin (hereinafter, referred to as "attitude information of the crane corresponding to the transportation origin").

In addition, the attitude information of the crane includes attitude information of the crane at the time of unloading the load W to the transportation destination (hereinafter, referred to as "attitude information of the crane corresponding to the transportation destination").

In addition, the operation information of the crane includes information relating to an operation amount of the operation input unit 319 (operation tool) corresponding to an attitude that the mobile crane C can take at the time of transporting the load W from the transportation origin to the transportation destination (hereinafter, referred to as "information relating to the operation amount of the operation tool").

<Transportation Destination Presentation Processing>

Figure 5:
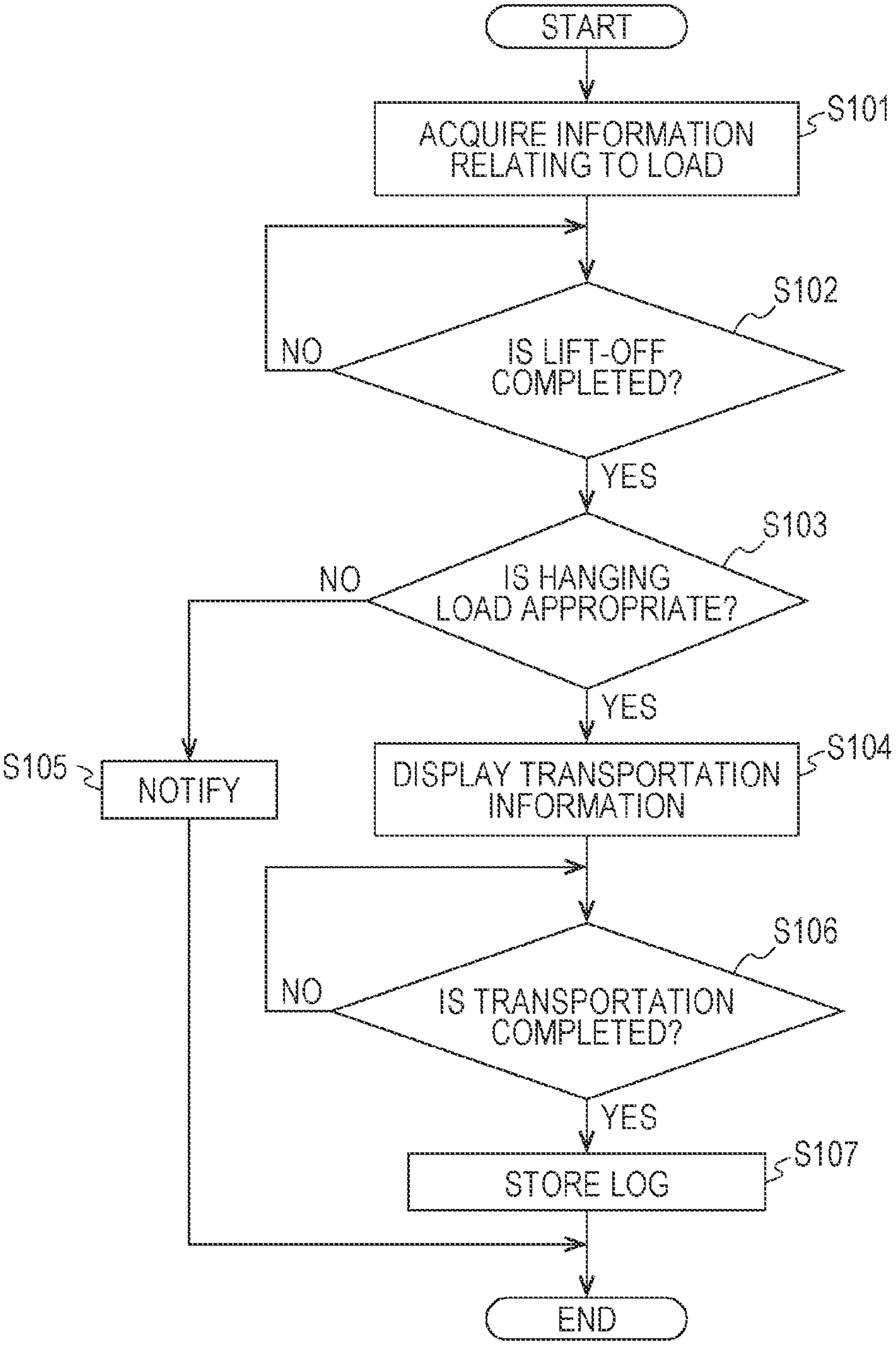
FIG. 5 is a flowchart of transportation destination presentation processing performed by the crane.

Hereinafter, transportation destination presentation processing (a transportation destination presentation method) performed by the mobile crane C in the transportation work of the mobile crane C will be described with reference to FIGS. 1 and 5. FIG. 5 is a flowchart of the transportation destination presentation processing. The flowchart illustrated in FIG. 5 illustrates the transportation destination presentation processing performed in the mobile crane C when the mobile crane C transports the load W from the transportation origin to the transportation destination.

The transportation destination presentation processing illustrated in FIG. 5 is implemented by a transportation destination presentation system S provided in the mobile crane C. The transportation destination presentation processing is implemented by cooperation of a plurality of elements provided in the mobile crane C. The operation of each of the elements may be performed by each of the elements autonomously or may be performed by each of the elements under the control of the control unit 326.

In the following description, for example, the transportation work performed by the mobile crane C is work of transporting the load W from the transportation origin T1 (position indicated by the small star in FIG. 1) illustrated in FIG. 1 to the transportation destination T2 (position indicated by the large star in FIG. 1).

FIG. 1 illustrates the mobile crane C disposed in the periphery of a building B. The mobile crane C illustrated in FIG. 1 lifts up the load W to a predetermined height. The transportation destination presentation processing is performed, for example, during a period from slinging work performed by a slinging operator to the completion of lift-off of the load W.

First, the operator operates the operation input unit 319 to move the hook device 312 above the load W placed on the transportation origin T1. Note that the operation of moving the hook device 312 above the load W may be automatically performed by the control unit 326.

In addition, the slinging operator hooks the sling wire rope 316 on the load W at an appropriate timing.

In step S101 of FIG. 5, the information reading device 320 acquires information relating to the load from the information storage unit 5 provided to the load W. Then, the information reading device 320 sends the acquired information relating to the load to the control unit 326. A start timing of the transportation destination presentation processing may be a time point when the information reading device 320 has acquired the information relating to the load from the information storage unit 5.

The information relating to the load acquired by the information reading device 320 in step S101 may include, for example, at least one of the identification information of the load, the transportation origin position information of the load, the transportation destination position information of the load, and the specification information of the load.

In step S101, it suffices that the information reading device 320 acquires the information relating to the load used in each control process of the present operation example.

The information reading device 320 stores the information relating to the load corresponding to the load W to which the information reading device 320 is attached. The information reading device 320 may be, for example, an IC tag, a barcode, or a QR code (registered trademark).

In a case where the information storage unit 5 is the IC tag, the information storage unit 5 may be, for example, a passive IC tag that uses a radio wave or the like from the information reading device 320 as a power source without being equipped with a battery, or an active IC tag equipped with a battery.

In addition, a communication system and a frequency band to be used between the information reading device 320 and the information storage unit 5 are not particularly limited. In addition, the information storage unit 5 may be, for example, a read-only IC tag that is dedicated to information reading and is not capable of information writing, or a read/write IC tag that enables reading and writing of information.

The transportation destination position information of the load stored in the information reading device 320 may include, for example, the latitude, longitude, and height of the transportation destination of the load W. The transportation origin position information of the load stored in the information reading device 320 may include, for example, the latitude, longitude, and height of the transportation origin of the load W.

In step S102 of FIG. 5, the control unit 326 determines whether the lift-off is completed. The control unit 326 determines whether the lift-off is completed on the basis of the information (for example, weight acting on the wire rope 311) acquired from the detection unit 325.

In step S102 of FIG. 5, for example, the control unit 326 determines that the lift-off is completed when the weight acting on the wire rope 311 increases and then becomes constant. Note that a method for determining the lift-off is not limited to this method.

When determining that the lift-off is completed ("YES" in step S102), the control unit 326 shifts the control process to step S103.

When determining that the lift-off is not completed ("NO" in step S102), the control unit 326 repeatedly executes the control process of step S102.

In step S103 of FIG. 5, the control unit 326 determines whether a load is appropriate. Specifically, the control unit 326 determines whether a load (hereinafter, referred to as a "hanging load") suspended by the mobile crane C is a load (hereinafter, referred to as a "planned hanging load") corresponding to the information relating to the load acquired from the information reading device 320.

In step S103, the control unit 326 calculates weight information of the load suspended by the mobile crane C on the basis of the weight acting on the wire rope 311 after completion of lift-off. Then, the control unit 326 determines whether the calculated weight information of the load matches (including an error within a predetermined range) weight information of the load acquired from the information reading device 320.

When the calculated weight information of the load matches (including the error within the predetermined range) with the weight information of the load acquired from the information reading device 320, the control unit 326 determines that the hanging load corresponds to the planned hanging load.

When determining that the hanging load corresponds to the planned hanging load ("YES" in step S103), the control unit 326 shifts the control process to step S104.

On the other hand, when the information relating to the calculated weight of the load does not match the weight information of the load acquired from the information reading device 320, the control unit 326 determines that the hanging load does not correspond to the planned hanging load.

When determining that the hanging load does not correspond to the planned hanging load ("NO" in step S103), the control unit 326 shifts the control process to step S105.

Note that the control unit 326 may perform the above-described transportation work determination at an appropriate timing before and after step S103. The above-described method of the transportation work determination is similarly applied. When determining that it is difficult for the mobile crane C to transport the load to the transportation destination as a result of the transportation work determination, the control unit 326 may notify the operator of such a fact.

In step S104, the control unit 326 controls the display unit 6 to display transportation information. Examples of the transportation information include the transportation destination position information of the load and the operation information of the crane.

The control unit 326 controls the display unit 6 to display the transportation information so as to be overlaid on an image (hereinafter, referred to as a "base image") displayed on the display unit 6.

In a case where the base image is an image captured by the imaging unit 324, the control unit 326 generates a composite image obtained by combining the transportation information with the image (base image) acquired from the imaging unit 324. Then, the control unit 326 controls the display unit 6 to display the composite image.

The base image is not limited to the image captured by the imaging unit 324. For example, the base image may be an image generated by an image generation application such as building information modeling (BIM).

The base image may be an image captured by an imaging device other than the imaging unit 324. The imaging device is preferably provided in the periphery of the mobile crane C and capable of capturing images of the mobile crane C, a position of the transportation origin of the load W, and a position of the transportation destination of the load W.

<Example of Image to be Displayed>

Figure 3:
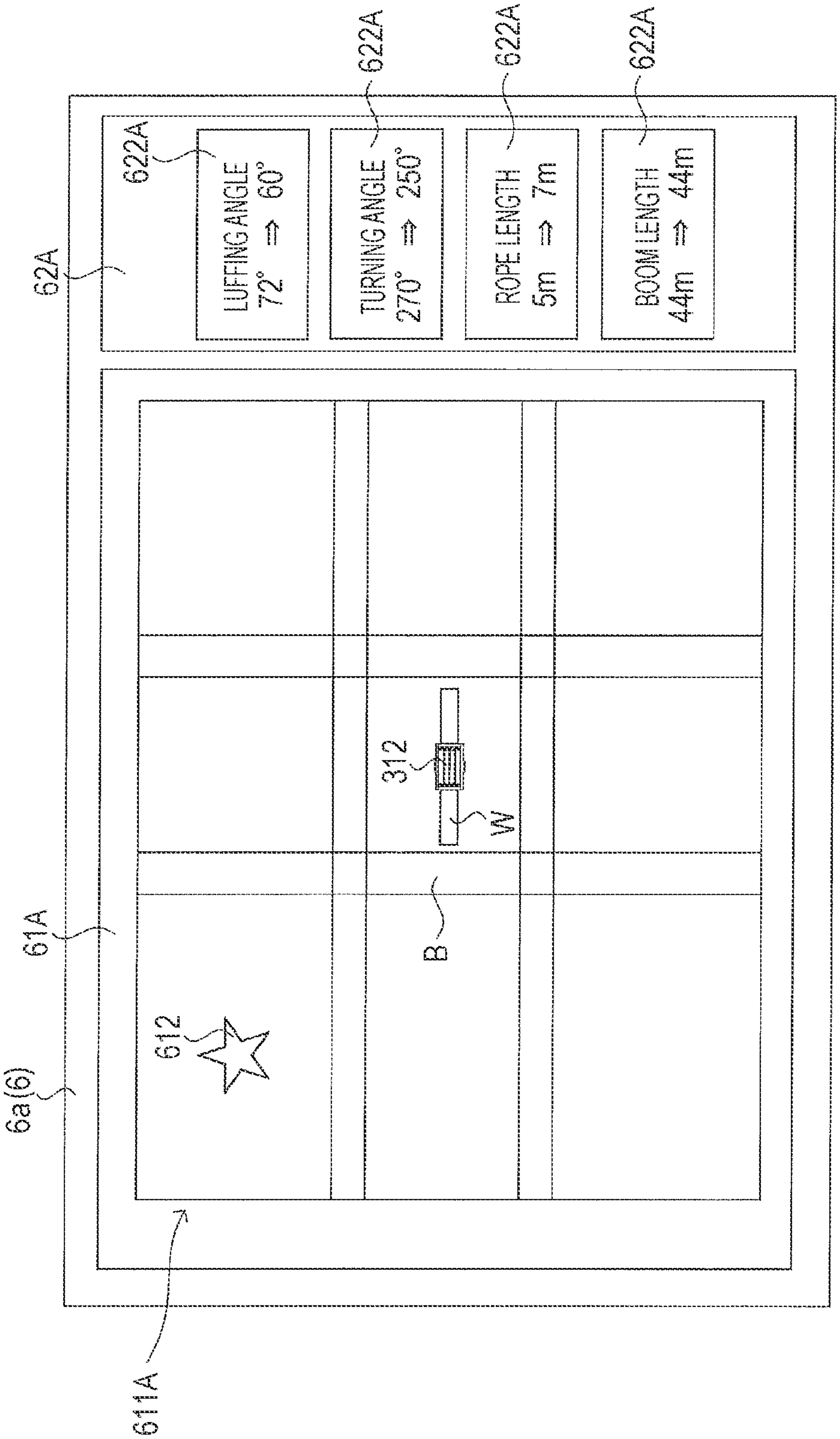
FIG. 3 is a view illustrating an example of an image displayed on a display unit.

Here, an example of an image (composite image) to be displayed on the display unit 6 will be described. FIG. 3 illustrates an example of an image generated by the control unit 326 and displayed on the display unit 6.

In this example, a screen 6*a* of the display unit 6 is divided into a first area 61A and a second area 62A. In the present example, the second area 62A is provided on the right side of the first area 61A on the screen 6*a*.

In the first area 61A, a first image 611A is displayed. The first image 611A includes a captured image (base image) captured by the imaging unit 324 and a transportation destination image 612 indicating a position of the transportation destination T2 in the captured image. The first image 611A is a composite image obtained by combining the transportation destination image 612 with the captured image (base image) captured by the imaging unit 324. The transportation destination image 612 corresponds to an example of the information relating to the position of the transportation destination.

In the second area 62A, a second image 622A is displayed. The second image 622A includes an image of the attitude information of the crane (hereinafter, referred to as an "attitude information image"). The attitude information image corresponds to an example of the information relating to the operation.

The attitude information image includes an image of information relating to a luffing angle (hereinafter, referred to as a "luffing angle image"), an image of information relating to a turning angle (hereinafter, referred to as a "turning angle image"), an image of information relating to a rope length (hereinafter, referred to as a "rope length image"), and an image of information relating to a boom length (hereinafter, referred to as a "boom length image").

The attitude information image includes, for each attitude, attitude information corresponding to the transportation origin and attitude information corresponding to the transportation destination. The attitude information corresponding to the transportation origin is the attitude information of the crane at the time of lifting up the load at the transportation origin. In addition, the attitude information corresponding to the transportation destination is the attitude information of the crane at the time of transporting the load to the transportation destination.

Specifically, the luffing angle image includes an image relating to a luffing angle corresponding to the transportation origin and an image relating to a luffing angle corresponding to the transportation destination. In the present example, a value ("72°" in this example) displayed on the left side is the luffing angle corresponding to the transportation origin. In addition, the value ("60°" in this example) displayed on the right side is the luffing angle corresponding to the transportation destination.

In addition, the turning angle image includes an image relating to a turning angle corresponding to the transportation origin and an image relating to a turning angle corresponding to the transportation destination. In the present example, a value ("270°" in this example) displayed on the left side is the turning angle corresponding to the transportation origin. In addition, a value ("250°" in this example) displayed on the right side is the turning angle corresponding to the transportation destination.

In addition, the rope length image includes an image relating to a rope length corresponding to the transportation origin and an image relating to a rope length corresponding to the transportation destination. In this example, a value ("5 m" in this example) displayed on the left side is the rope length corresponding to the transportation origin. In addition, a value ("7 m" in this example) displayed on the right side is the rope length corresponding to the transportation destination.

In addition, the boom length image includes an image relating to a boom length corresponding to the transportation origin and an image relating to a boom length corresponding to the transportation destination. In this example, a value ("44 m" in this example) displayed on the left side is the boom length corresponding to the transportation origin. In addition, a value ("44 m" in this example) displayed on the right side is the boom length corresponding to the transportation destination.

The first image 611A and the second image 622A as described above are composite images obtained by combining the base image with the crane operation information (attitude information image and the transportation destination image). The first image 611A and the second image 622A are continuously displayed on the display unit 6 during the transportation work.

The control unit 326 may display the attitude information image in a display mode in which the operator can recognize the order of motions (hereinafter, referred to as "priorities of the motions") when the load is transported from the transportation origin to the transportation destination.

Specifically, the control unit 326 may change a color of the attitude information in the attitude information image in accordance with the priority (priority order) of the motion. In the case of the present example, if the attitude information image is displayed in four colors, the operator can recognize the priorities of the motions by color. Note that, in a case where the priorities of the motions are the same, the attitude information images may have the same color.

In addition, the control unit 326 may display attitude information corresponding to a motion having a higher motion priority on the upper side in the attitude information image. In the case of the attitude information image illustrated in FIG. 3, a motion of changing the luffing angle, a motion of changing the turning angle, a motion of changing the rope length, and a motion of changing the boom length are displayed in descending order of the priority of the motion.

In addition, the control unit 326 may display the attitude information image in a display mode in which the operator can recognize attitude information that has reached the attitude information of the transportation destination. For example, the control unit 326 may use a color (for example, red) of attitude information that has reached the attitude information of the transportation destination (target attitude) different from a color (for example, white) of attitude information that has not reached the attitude information of the transportation destination (target attitude).

<Example of Image to be Displayed>

Figure 4:
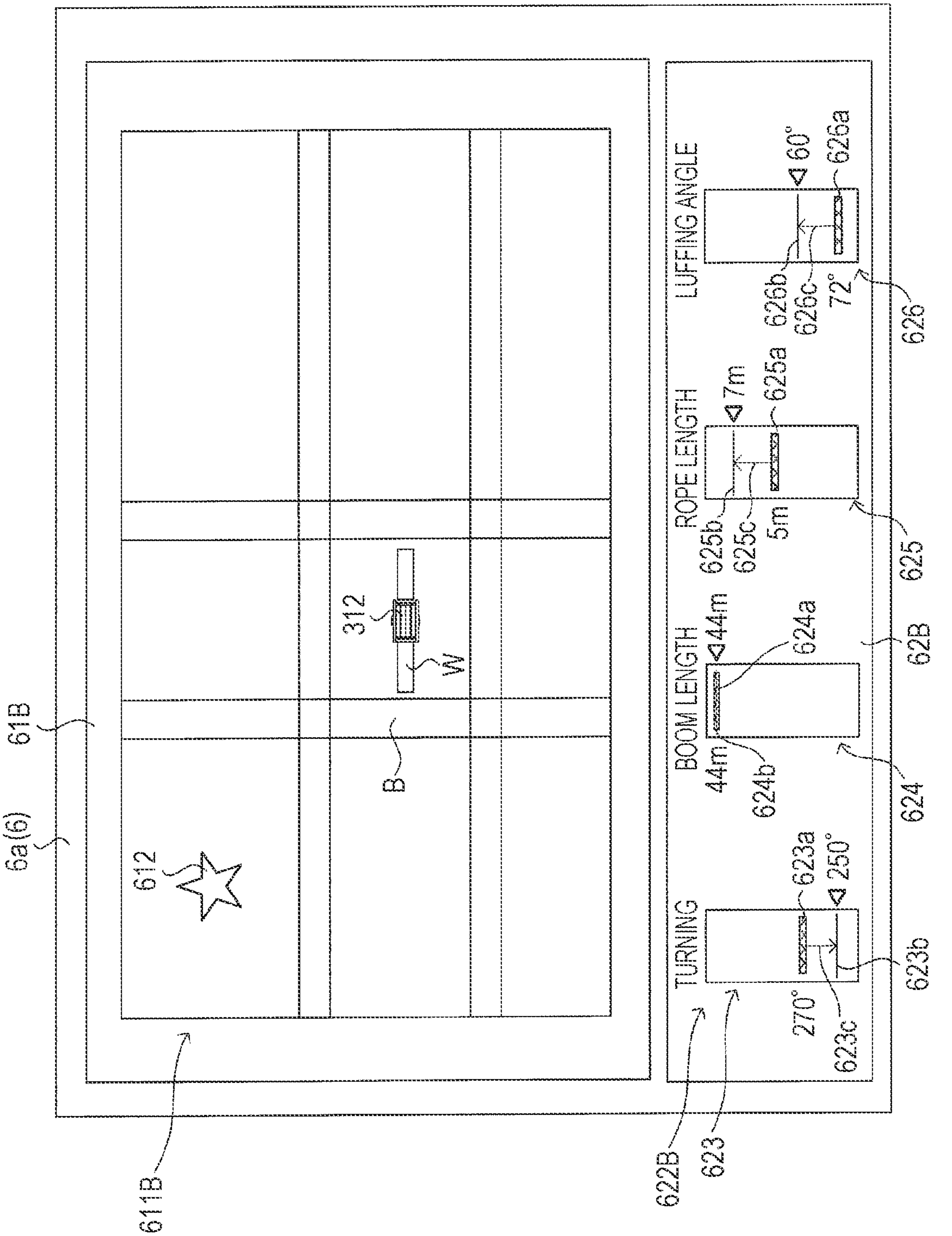
FIG. 4 is a view illustrating an example of an image displayed on the display unit.

An example of an image to be displayed on the display unit 6 will be described. FIG. 4 illustrates an example of an image generated by the control unit 326 and displayed on the display unit 6.

In this example, the screen 6*a* of the display unit 6 is divided into a first area 61B and a second area 62B. In the present example, the second area 62B is provided on the lower side of the first area 61B on the screen 6*a*.

In the first area 61B, a first image 611B is displayed. The first image 611B includes a captured image captured by the imaging unit 324 and a transportation destination image 612 indicating a position of the transportation destination T2 in the captured image.

In the second area 62B, a second image 622B is displayed. The second image 622B includes an image of the attitude information of the crane (hereinafter, referred to as an "attitude information image"). The attitude information image includes an image relating to a luffing angle, an image relating to a turning angle, an image relating to a rope length, and an image relating to a boom length.

The attitude information image includes, for each attitude, attitude information corresponding to the transportation origin and attitude information corresponding to the transportation destination. The attitude information corresponding to the transportation origin is the attitude information of the crane at the time of lifting up the load at the transportation origin. In addition, the attitude information corresponding to the transportation destination is the attitude information of the crane at the time of transporting the load to the transportation destination.

In addition, the attitude information image includes an image (hereinafter, referred to as an "operation unit simulated image") that simulates the operation input unit 319. In the case of the present example, the operation unit simulated image includes an image that simulates an operation lever constituting the operation input unit 319.

The attitude information image has a mode in which the operator can recognize an operation direction and an operation amount of the operation lever to be operated when the load is transported from the transportation origin to the transportation destination. The attitude information image includes an image indicating a position of the operation lever corresponding to the transportation origin, an image indicating a position of the operation lever corresponding to the transportation destination, and an image indicating a direction of the operation lever to be operated by the operator.

The image indicating the position of the operation lever corresponding to the transportation origin, the image indicating the position of the operation lever corresponding to the transportation destination, and the image indicating the direction of the operation lever to be operated by the operator correspond to examples of the information relating to the operation amount of the operation unit and the information relating to the operation direction of the operation unit.

In the present example, the second image 622B includes, in order from the left, an image relating to a turning angle, an image relating to a boom length, an image relating to a rope length, and an image relating to a luffing angle.

Specifically, the image relating to the turning angle includes an operation lever simulated image 623 that simulates an operation lever for turning (hereinafter, referred to as a "turning lever"), the image relating to the turning angle corresponding to the transportation origin, and the image relating to the turning angle corresponding to the transportation destination.

The operation lever simulated image 623 includes a transportation origin lever position image 623*a* indicating a position of the turning lever corresponding to the transportation origin, a transportation destination lever position image 623*b* indicating a position of the turning lever corresponding to the transportation destination, and an operation direction image 623*c* indicating an operation direction of the turning lever to be operated by the operator.

In addition, in the case of the present example, a value ("270°" in this example) displayed on the left side of the operation lever simulated image 623 is the turning angle corresponding to the transportation origin. In addition, a value ("250°" in this example) displayed on the right side is the turning angle corresponding to the transportation destination.

In addition, the image relating to the boom length includes an operation lever simulated image 624 that simulates an operation lever for extension and retraction (hereinafter, referred to as an "extension/retraction lever"), the image relating to the boom length corresponding to the transportation origin, and the image relating to the boom length corresponding to the transportation destination.

The operation lever simulated image 624 includes a transportation origin lever position image 624*a* indicating a position of the extension/retraction lever corresponding to the transportation origin, a transportation destination lever position image 624*b* indicating a position of the extension/retraction lever corresponding to the transportation destination, and an operation direction image (not illustrated) indicating an operation direction of the extension/retraction lever to be operated by the operator.

Note that the position of the extension/retraction lever corresponding to the transportation origin and the position of the extension/retraction lever corresponding to the transportation destination are the same in the case of the present example, and thus, the operator does not operate the extension/retraction lever. Thus, the operation direction image indicating the operation direction of the extension/retraction lever is omitted.

In addition, in the case of the present example, a value ("44 m" in this example) displayed on the left side of the operation lever simulated image 624 is the boom length corresponding to the transportation origin. In addition, a value ("44 m" in this example) displayed on the right side is the boom length corresponding to the transportation destination.

In addition, the image relating to the rope length includes an operation lever simulated image 625 that simulates an operation lever for a winch (hereinafter, referred to as a "winch lever"), the image relating to the rope length corresponding to the transportation origin, and the image relating to the rope length corresponding to the transportation destination.

The operation lever simulated image 625 includes a transportation origin lever position image 625*a* indicating a position of the winch lever corresponding to the transportation origin, a transportation destination lever position image 625*b* indicating a position of the winch lever corresponding to the transportation destination, and an operation direction image 625*c* indicating an operation direction of the winch lever to be operated by the operator.

In addition, in the case of the present example, a value ("5 m" in this example) displayed on the left side of the operation lever simulated image 625 is the rope length corresponding to the transportation origin. In addition, a value ("7 m" in this example) displayed on the right side is the rope length corresponding to the transportation destination.

In addition, the image relating to the luffing angle includes an operation lever simulated image 626 that simulates an operation lever for luffing (hereinafter, referred to as a "luffing lever"), the image relating to the luffing angle corresponding to the transportation origin, and the image relating to the luffing angle corresponding to the transportation destination.

The operation lever simulated image 626 includes a transportation origin lever position image 626*a* indicating a position of the luffing lever corresponding to the transportation origin, a transportation destination lever position image 626*b* indicating a position of the luffing lever corresponding to the transportation destination, and an operation direction image 626*c* indicating an operation direction of the luffing lever to be operated by the operator.

In addition, in the case of the present example, a value ("72°" in this example) displayed on the left side of the operation lever simulated image 626 is the luffing angle corresponding to the transportation origin. In addition, the value ("60°" in this example) displayed on the right side is the luffing angle corresponding to the transportation destination.

In this example as well, the first image 611B and the second image 622B are continuously displayed on the display unit 6 during the transportation work. The control unit 326 may display the attitude information image in a display mode in which the operator can recognize the order of motions (hereinafter, referred to as "priorities of the motions") when the load is transported from the transportation origin to the transportation destination.

Specifically, the control unit 326 may change a color of the attitude information in the attitude information image in accordance with the priority of the motion. In the case of the present example, if the attitude information image is displayed in four colors, the operator can recognize the priorities of the motions by color. Note that, in a case where the priorities of the motions are the same, the attitude information images may have the same color.

In addition, the control unit 326 may display attitude information corresponding to a motion having a higher motion priority on the left side in the attitude information image. In the case of the attitude information image illustrated in FIG. 4, a motion of changing the turning angle, a motion of changing the boom length, a motion of changing the rope length, and a motion of changing the luffing angle are displayed in descending order of the priority of the motion.

In addition, the control unit 326 may display the attitude information image in a display mode in which the operator can recognize attitude information that has reached the attitude information of the transportation destination. For example, the control unit 326 may use a color (for example, red) of attitude information that has reached the attitude information of the transportation destination (target attitude) different from a color (for example, white) of attitude information that has not reached the attitude information of the transportation destination (target attitude).

Here, the description returns to the flowchart of FIG. 5. In step S105 of FIG. 5, the control unit 326 notifies that the hanging load is not appropriate. For example, the control unit 326 controls the display unit 6 so as to display that the hanging load is not appropriate. Then, the control unit 326 ends the transportation position presentation processing.

In step S106 of FIG. 5, the control unit 326 determines whether the transportation of the load W is completed. A state in which the transportation of the load W is completed may be regarded as a state in which the load W is transported to the transportation destination and the load W is detached from the hook device 312.

The control unit 326 calculates a position of the load W hooked on the hook device 312, and determines that the load W has been transported to the transportation destination when the calculated position of the load W matches a position corresponding to the position information of the transportation destination.

In addition, the control unit 326 determines that the load W is placed at a predetermined position of the transportation destination on the basis of information (for example, weight acting on the wire rope 311) acquired from the detection unit 325.

When determining that the transportation of the load W is completed (the installation of the load W is completed) ("YES" in step S106), the control unit 326 shifts the control process to step S107.

When determining that the transportation of the load W is not completed ("NO" in step S106), the control unit 326 repeats the control process of step S106.

In step S107 of FIG. 5, the control unit 326 generates a log of the completed transportation work and stores the log in the storage unit 327.

The log of the transportation work includes, for example, a work date, information relating to the load, a start time of the transportation work, and an end time of the transportation work.

Examples of the information relating to the load included in the transportation work log include at least one of the identification information of the load, the transportation origin position information of the load, the transportation destination position information of the load, and the specification information of the load.

The transportation work log may include information relating to the crane that has performed the transportation work. The information relating to the crane may include identification information of the crane.

The log of the transportation work may include information relating to an attitude of the crane during the transportation work. The information relating to the attitude of the crane included in the log of the transportation work may include the attitude information of the crane at the transportation origin and/or the attitude information of the crane at the transportation destination.

The log of the transportation work may include a result of the transportation work determination performed by the control unit 326. Note that when the result of the transportation work determination is "transportation impossible", the transportation work is not performed. In this case, the log of the transportation work includes, for example, the work date, information relating to the load, and information relating to the crane. The information relating to the crane may include identification information of the crane.

Note that the control unit 326 may control the writing unit (not illustrated) of the information reading device 320 so as to store barycentric coordinates of the load W when the transportation of the load W has been completed (the installation of the load W has been completed) in the information storage unit 5 provided to the load W in the information storage unit 5 in step S107 of FIG. 5. The control unit 326 calculates the barycentric coordinates of the load W on the basis of the attitude information of the crane corresponding to the transportation destination. Such barycentric coordinates of the load W are used for shape management.

Then, the control unit 326 ends the transportation destination presentation processing.

Function and Effect of Present Embodiment

According to the present embodiment having the above configuration, work efficiency can be improved. That is, in the case of the present embodiment, the information reading device 320 provided in the hook device 312 acquires the transportation destination position information of the load from the information storage unit 5 provided to the load W. Then, the transportation destination position information acquired by the information reading device 320 is displayed on the display unit 6. The operator can know the transportation destination of the load by viewing the transportation destination position information displayed on the display unit 6.

In the case of the present embodiment, the slinging operator can perform the slinging work without performing the work of reading the transportation destination position information from the information storage unit 5 provided to the load W. Thus, the work efficiency of the transportation work can be improved.

In addition, the log of the transportation work is stored in the storage unit 327 in the case of the present embodiment. Such a log can be used for performance management after work. Note that the mobile crane C may acquire transportation destination position information of another load from the information storage unit 5 provided to the load (hereinafter, referred to as the "other load") other than the load transported by the mobile crane C itself by the information reading device 320.

When the transportation destination position information of the other load is acquired, the control unit 326 of the mobile crane C may estimate information relating to a position of the other load (hereinafter, referred to as "estimated position information of the other load") on the basis of a detection value of the position detection unit 317A, for example.

Then, the control unit 326 may store the transportation destination position information of the other load and the estimated position information of the other load in the storage unit 327 in association with each other.

In addition, when barycentric coordinates of the other load are stored in the information storage unit 5 provided to the other load, the mobile crane C may acquire the barycentric coordinates of the load from the information storage unit 5 provided to the other load by the information reading device 320. Then, the control unit 326 may store the transportation destination position information of the other load and the barycentric coordinates of the other load in the storage unit 327 in association with each other.

For example, it is possible to determine whether the other load is installed at a transportation destination by comparing the transportation destination position information of the other load with the estimated position information of the other load or the barycentric coordinates of the other load by a performance management system such as a server. Even if a comparison reference position deviates from the position of the transportation destination of the other load, the performance management system may determine that the other load is installed at the transportation destination as long as the deviation is within a predetermined range.

INDUSTRIAL APPLICABILITY

The present invention is applicable to various cranes as well as the mobile crane.

REFERENCE SIGNS LIST

B building
C mobile crane
S transportation destination presentation system
T1 transportation origin
T2 transportation destination
W load
1 traveling body

11 wheel
2 outrigger
3 turning body
301 turning base
302 telescopic boom
303 distal boom element
304 intermediate boom element
305 proximal boom element
306 extension/retraction device
307 extension/retraction cylinder device
308 luffing device
309 extension/retraction cylinder device
310 jib
311 wire rope
312 hook device
313 cab
314 hook block
315 hook
316 sling wire rope
317A position detection unit
319 operation input unit
320 information reading device
321 reading unit
322 first communication unit
323 second communication unit
324 imaging unit
325 detection unit
326 control unit
327 storage unit
5 information storage unit
6 display unit
6*a* screen
61A, 61B first area
62A, 62B second area
611A, 611B first image
612 transportation destination image
622A, 622B second image
623, 624, 625, 626 operation lever simulated image
623*a*, 624*a*, 625*a*, 626*a* transportation origin lever position image
623*b*, 624*b*, 625*b*, 626*b* transportation destination lever position image
623*c*, 625*c*, 626*c* operation direction image

The invention claimed is:

1. A crane for transporting a load from a transportation origin to a transportation destination, the crane comprising:
an operation function unit provided to be turnable;
a hook suspended by a wire rope from a distal end part of the operation function unit;
an information-reading unit provided to the hook or a member that moves with the hook, the information-reading unit acquiring information relating to a position of the transportation destination from an information storage unit provided to the load;
a control unit calculating information relating to an operation of the crane for transporting the load to the transportation destination based on the information relating to the position acquired from the information-reading unit; and
a display unit displaying the information relating to the position and the information relating to the operation, wherein
the information-reading unit acquires information relating to the load from the information storage unit, and
the control unit:
acquires attitude information of the crane at the transportation destination,
acquires, as performance information, a maximum weight of a load that can be lifted when the crane is in an attitude indicated by the attitude information,
determines whether the crane can transport the load to the transportation destination based on the information relating to the position, the information relating to the load, and the performance information, and
controls the display unit to display a result of the determination when it is determined that the crane cannot transport the load to the transportation destination.

2. The crane according to claim 1, wherein
the control unit calculates information relating to an attitude of the crane that the crane is able to take when the load is transported to the transportation destination based on the information relating to the position, and performs the determination based on the information relating to the attitude.

3. The crane according to claim 1, wherein
the information relating to the operation includes information relating to an attitude of the crane that the crane is able to take when the load is transported to the transportation destination.

4. The crane according to claim 3, wherein
the information relating to the operation includes information relating to an attitude of the crane corresponding to the transportation origin and the attitude information relating to the attitude of the crane corresponding to the transportation destination.

5. The crane according to claim 1, further comprising
a plurality of operation units for operating the crane,
wherein the information relating to the operation includes information relating to an operation amount of the operation unit and information relating to an operation direction of the operation unit, the operation amount and the operation direction corresponding to an attitude of the crane that the crane is able to take when the load is transported from the transportation origin to the transportation destination.

6. The crane according to claim 2, wherein
the information relating to the attitude includes a turning angle of the operation function unit, a length of the operation function unit, a luffing angle of the operation function unit, and a suspended length of the wire rope, and
the display unit displays information reaching a target attitude corresponding to the information relating to the position of the transportation destination and information not reaching the target attitude in different display modes out of the information relating to the attitude.

7. The crane according to claim 1, wherein
the display unit displays the information relating to the operation in a display mode in accordance with a priority order of a motion in the crane.

8. The crane according to claim 1, further comprising
a storage unit for storing identification information of the load in association with position information of the load corresponding to the transportation destination for each transportation.

9. A transportation destination presentation method performed in a crane for transporting a load from a transportation origin to a transportation destination, the transportation destination presentation method comprising:
a step of acquiring, by an information-reading unit provided in a hook or a member that moves with the hook, information relating to a position of the transportation destination from an information storage unit provided to the load;

a step of calculating information relating to an operation of the crane for transporting the load to the transportation destination based on the information relating to the position acquired from the information-reading unit;

a step of displaying the information relating to the position and the information relating to the operation;

a step of acquiring information relating to the load from the information storage unit;

a step of acquiring attitude information of the crane at the transportation destination;

a step of acquiring, as performance information, a maximum weight of a load that can be lifted when the crane is in an attitude indicated by the attitude information;

a step of determining whether the crane can transport the load to the transportation destination based on the information relating to the position, the information relating to the load, and the performance information; and a step of displaying a result of the determination when it is determined that the crane cannot transport the load to the transportation destination.

* * * * *